Nov. 14, 1939.  I. R. VERSOY  2,180,181
DEVICE FOR POSTURE STUDY
Filed Feb. 8, 1938  3 Sheets-Sheet 1
*Fig.1.*  *Fig.2.*  *Fig.3.*
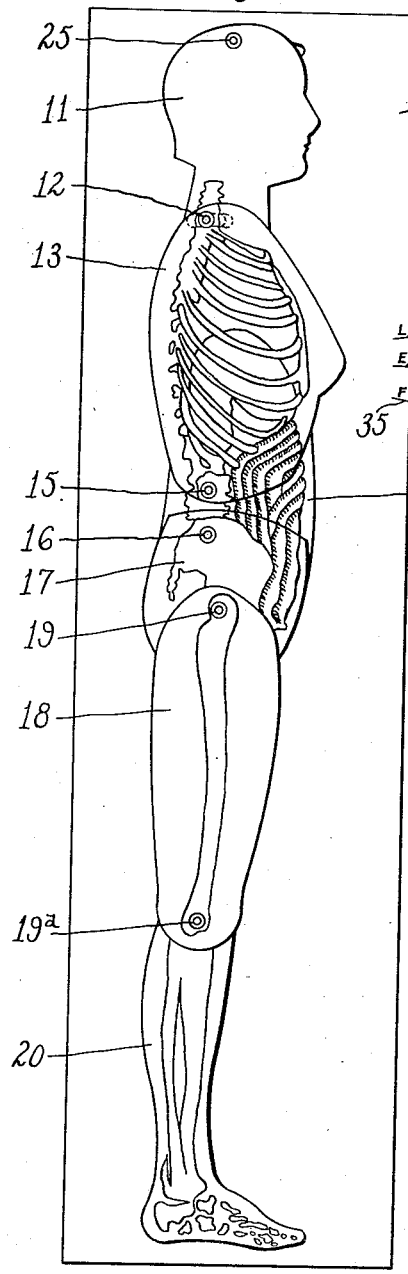
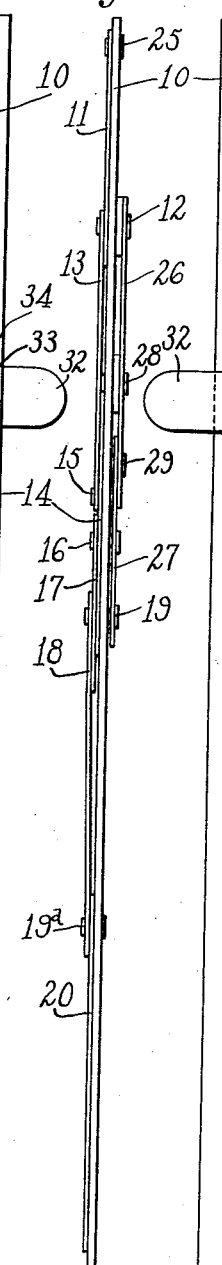
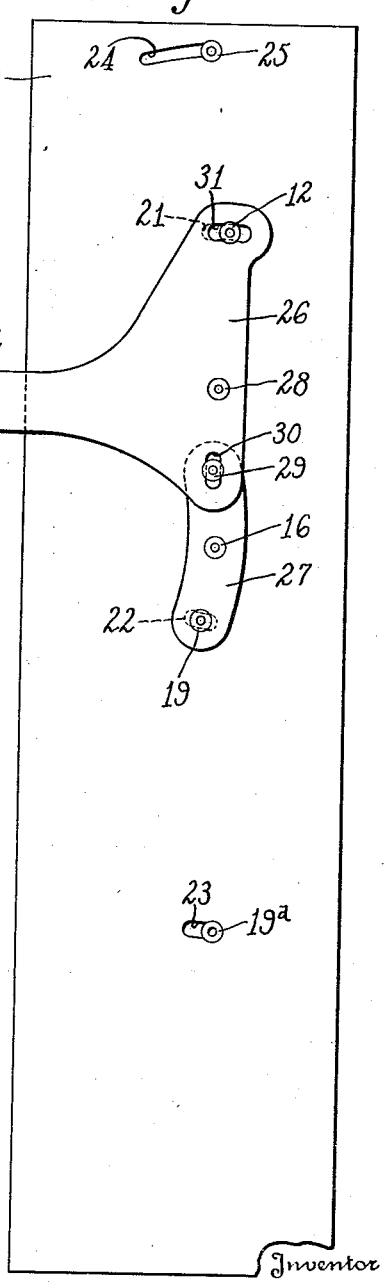
Inventor
Irving R. Versoy
By Rockwell & Bartholow
Attorneys Nov. 14, 1939.  I. R. VERSOY  2,180,181
DEVICE FOR POSTURE STUDY
Filed Feb. 8, 1938 3 Sheets—Sheet 2
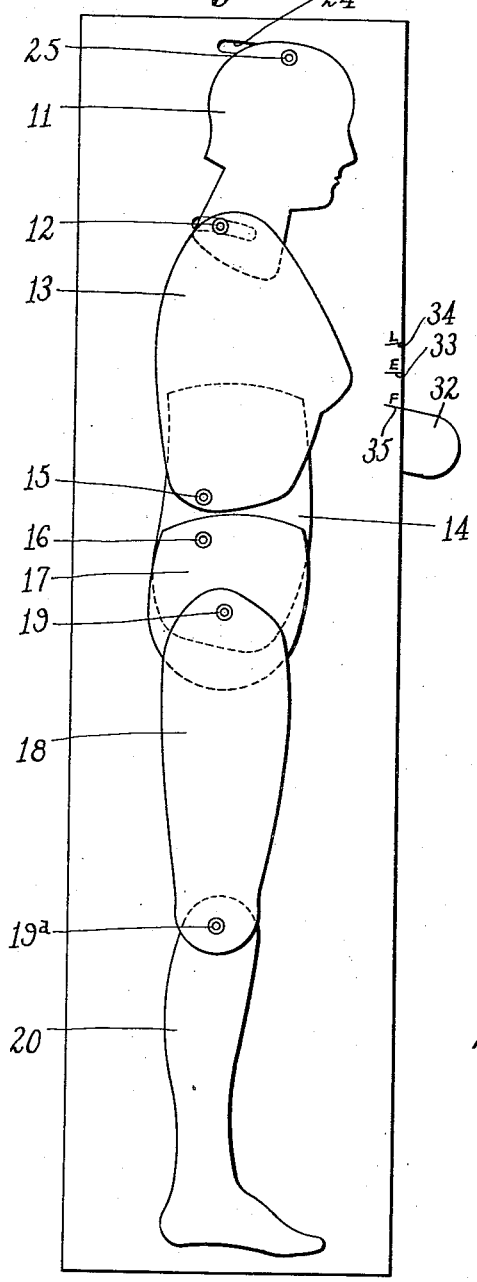
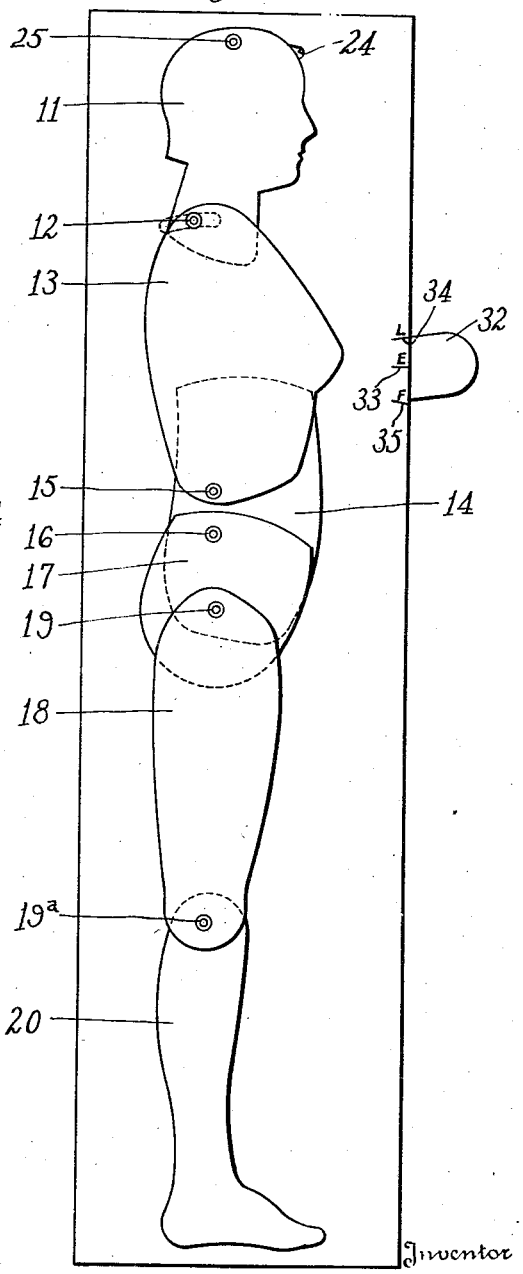

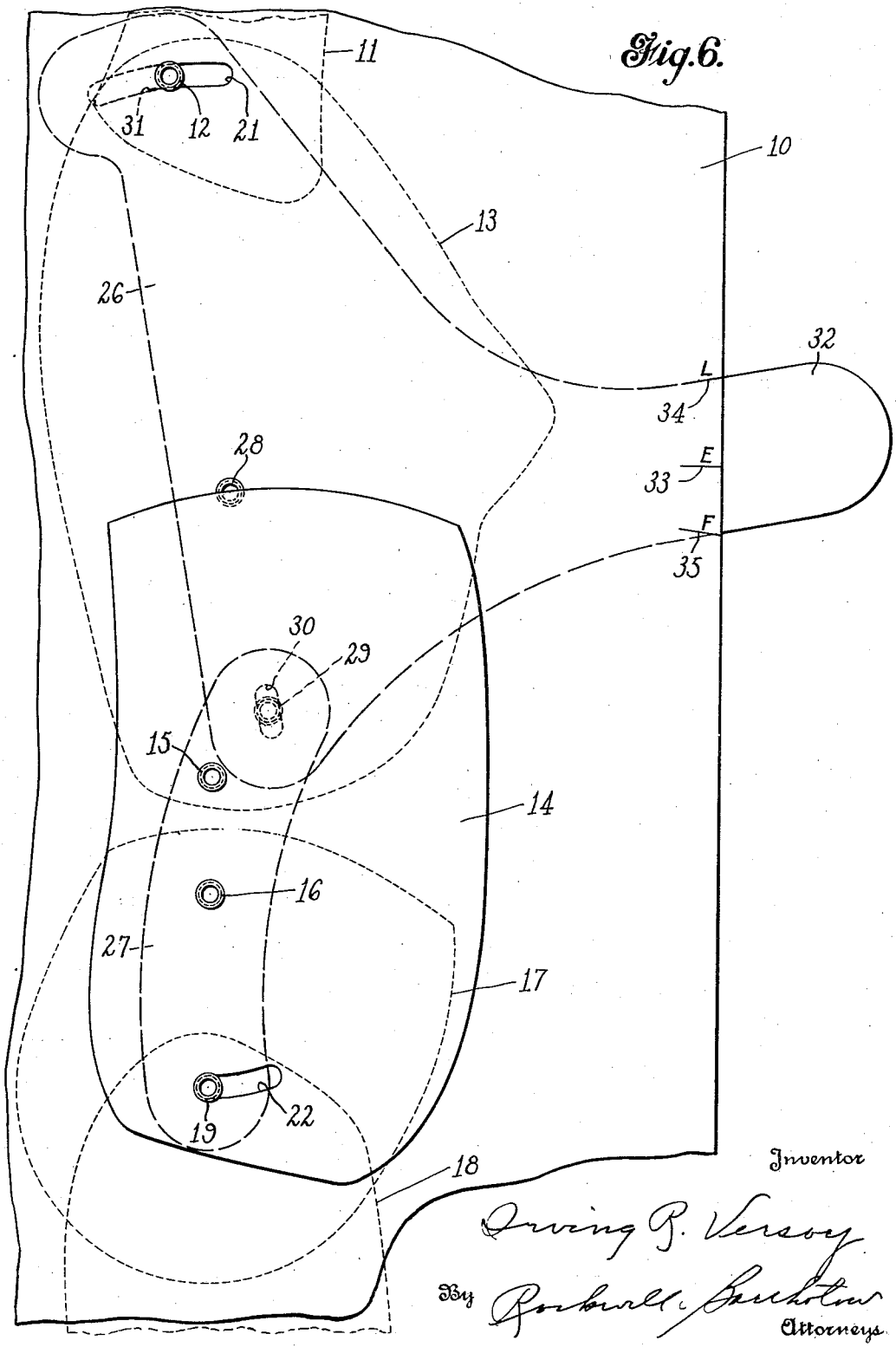

Patented Nov. 14, 1939

2,180,181

UNITED STATES PATENT OFFICE 2,180,181

DEVICE FOR POSTURE STUDY

Irving R. Versoy, New Haven, Conn., assignor to The Berger Brothers Company, New Haven, Conn., a corporation of Connecticut Application February 8, 1938, Serial No. 189,350

3 Claims. (Cl. 35—17)

This invention relates to a device designed to be employed in the study of various postures of the human body, and more particularly to a two-dimensional jointed figure having parts of the form and shape of the human body in profile, which parts are pivotally or flexibly joined together at points approximating joints of the human body, and which may be secured to a card or other supporting member so that movement of the parts relatively thereto is permitted. The invention also relates to a simple and effective means for moving and controlling the various parts of the figure whereby it may be made to assume various recognized postures, incorrect as well as correct.

The correct erect posture of the human body is well recognized, as are also certain well-known types of incorrect postures, such, for example, as the lordosis and fatigue postures. Such incorrect postures, particularly with respect to that part of the body around the abdominal region, may be corrected, or at least greatly benefited, by a proper design of corset or belt. It is, therefore, of great advantage to corsetieres and fitters of these garments to know the position of various parts of the body in the correct and incorrect postures, and to understand the principles of correction of incorrect postures by discerning at what points pressure should be applied to the body to correct a given error or deformity. It is also desirable for the fitters of such garments to be able to show a prospective customer the difference between the correct posture and certain recognized types of incorrect posture, and to be able to make adjustments of the illustrative figure from one posture to the other readily and simply, without having to move each section or part of the figure separately.

One object of the present invention is the provision of a posture study device comprising a jointed figure simulating the form of the human body in profie, the parts of which are flexibly joined or pivoted together at points approximating joints of the human body, and which parts may be moved into various positions by means of an operating or control member.

A still further object of the invention is the provision of a jointed figure simulating the form of the human body in profile and having represented on the various parts thereof the internal organs of the human bady, the parts being flexibly joined together and in addition secured to or mounted upon a supporting member in such a manner that they may be readily and easily moved to various recognized positions of posture to illustrate the effect of such movement on the internal organs represented on the parts of the figure.

A still further object of the invention is the provision of a jointed figure mounted upon a card or other suitable support having parts or sections simulating the form of the human body in profile, and flexibly joined together at points approximating natural joints of the human body, so that the parts may be readily moved from one position to another and controlled in such movement, and thereby be placed in various recognized postures whereby the movement of the parts faithfully portrays the position of various parts of the body in such postures.

A still further object of the invention is to provide a simple and efficient manipulating means whereby the parts or sections of a jointed figure representing the human body in profile, and mounted upon a suitable support, may be readily moved to positions corresponding to various recognized postures of the human body to illustrate the position of parts of the body in such postures, and the parts being so controlled in such movement that faithful representations of the parts of the body in such postures will be obtained.

To these and other ends the invention consists in the novel features and combinations of parts to be hereinafter described and claimed.

In the drawings:

Fig. 1 is a front elevational view of a posture study device embodying my improvements;

Fig. 2 is a side elevational view of the same;

Fig. 3 is a rear view of the device;

Fig. 4 is a view in outline similar to Fig. 1, showing the parts in another position;

Fig. 5 is a view similar to Fig. 4, but showing the parts in a still different position; and Fig. 6 is an enlarged detail view showing the position of certain of the parts in a posture corresponding to that shown in Fig. 5.

To illustrate a preferred embodiment of my invention, I have shown in Fig. 1 a support member 10 to which the various sections of the jointed figure are attached. This support may be in the form of a card or similar flat plane member, and may be made of cardboard, Celluloid, or other suitable material. Attached to the support is a two-dimensional figure simulating the outline of the human body in profile, this figure being made of a plurality of sections and illustrating the exterior outline of the human body, including the fleshy portions thereof. The figure is composed of flat or plane two-dimensional sections, which may be of any suitable material such as relatively stiff cardboard, or Celluloid.

The figure comprises a head portion 11 pivoted by the eyelet 12 to a chest portion 13, which is in turn pivoted to the abdominal portion 14 by suitable means such as the eyelet 15. Pivoted to the abdominal portion 14 by the eyelet 16 is the pelvic or hip portion 17, and an upper leg portion 18 is pivoted to the abdominal section by the eyelet 19. The lower leg section 20 may be pivoted to the upper leg section by the eyelet 19a.

All of the above eyelets pass through the card or supporting member 10, but as movement of certain of the parts relatively to the card is permitted, it will be noted that certain of these pivots are disposed in slots in the card, so that they may be free to move within limits permitted by the slots, as will be described hereinafter.

For example, the pivot member 12 is disposed in a slot 21 in the card, so that, while the members 11 and 13 are permitted relative movement about the pivot 12, this pivot is also free to move within the slot 21. The pivots 15 and 16 are not permitted any bodily movement with respect to the card 10, so that in the present embodiment of the invention the member 14 is fixed to the card by these pivots, but the members 13 and 17 will be permitted movement about the pivots 15 and 16 relatively to each other and relatively to the abdominal section 14.

The pivot 19 is mounted in a slot 22 in the card 10, so that this pivot is free to move relatively to the card, and likewise the pivot 19a is disposed within a slot 23 in the card, so that the knee joint will be permitted a forward and backward movement. In addition, the card 10 is provided adjacent its upper portion with a slot 24 in which is disposed a securing member in the form of an eyelet 25, so that the slot 24 limits and controls the movement permitted the upper portion of the head and neck section 11 of the figure. It is, of course, possible to move the various parts of the figure by hand. However, such movement would have to be effected upon each part individually, and in such case there would be no coordination of movement between them, and while one section of the figure might be in the correct position for a given posture, for example, erect posture, there would be no assurance that another part of the figure would be in a corresponding position, particularly if the manipulation was made by an unskilled operator. I have found it desirable, therefore, to provide a manipulating or moving means for the various parts of the figure, such that, by the movement of a simple lever from one extreme position to another, the figure may be made to assume various recognized postures. During this manipulation the movement of the various parts of the figure will be so controlled that they will always be in proper relation to each other, and, when the lever is moved to a certain definite position, all parts of the figure will be in the proper relation to show a body posture corresponding to that position.

To effect this result, I provide upon the back of the card a pair of levers 26 and 27, the lever 26 being pivoted to the card by the eyelet 28, and the lever 27 being pivoted upon the eyelet 16, which passes through this lever as well as through the card and the sections 14 and 17 of the figure. The lever 27 carries an eyelet 29 which is disposed in a slot 30 in the lower end of the lever 26, so that a movement of the lever 26 about the pivot 28 will also effect movement of the lever 27 about its pivot 16.

The eyelet 19 is also passed through the lever 27, so that movement of the lever 27 will move the eyelet 19 within the slot 22, and will, of course, also move the sections 17 and 18, which are joined by the eyelet 19. At its upper end the lever 26 is provided with a slot 31 in which is disposed the eyelet 12. This arrangement provides for the movement of the eyelet 12 within limits permitted by the slot 21 when the lever 26 is moved, and also provides, by reason of the slot 31, a lost-motion connection between the lever 26 and the eyelet 12, so that the latter may be moved through a lesser arc than the upper end of the lever 26.

The lever 26 is provided with an arm 32 which extends outwardly beyond the supporting member or card 10, so that it may be readily grasped by the fingers of the operator and moved to various positions. By reference to Fig. 1 it will be seen that the movement of the arm 32 is principally in a vertical direction, as shown in this figure, and it has been found convenient to arrange various markings or indicia upon the card 10, which will indicate the positions of the arm 32, or lever 26, which correspond to various recognized postures. For example, in Fig. 1 of the drawings, the upper edge of the lever is opposite the letter E shown upon the card 10 at 33. This position of the arm 32 corresponds to the erect position of the sectional figure. If, for example, the arm 32 is moved upwardly until its upper edge registers with the mark designated L at 34, the parts of the figure will be moved to what is known as the lordosis position, shown in Fig. 5. If, however, the lever is moved downwardly so that the upper edge of the arm 32 registers with the letter F, shown at 35 on the drawings, the figure will be caused to assume the fatigue posture or position, shown in Fig. 4 of the drawings.

It, of course, would be possible to arrange connections between the lever 26 and the eyelets 19a and 25 to move these eyelets in the slots 23 and 24, and thereby move the upper portion of the head and the knee joints of the figure. This, however, would necessitate a more complicated system of levers, and it has been found to be desirable to merely permit comparatively free movements of the eyelets 19a and 28 in the slots 23 and 24, and if these parts do not automatically assume the proper positions when the arm 32 is moved, the operator may by his fingers give them any slight adjustment which may be necessary.

It will be noted that the actuating means comprising the levers 26 and 27 pivoted on the back of the support 10 are of very simple construction and are connected to the figure at two points only. Thus it will be seen that the various changes in posture which can be made may be accomplished principally by moving the pivots 12 and 19, thus moving the upper chest section about the pivot 15, and the pelvic section about the pivot 16. The position of the upper leg section 18 is, of course, also changed when the pivot 19 is moved. The movements of the sections 13 and 17, however, take place relatively to the abdominal section 14, which in the form of my invention shown, is fixed to the support 10. It has been determined that it is unnecessary to move the abdominal section to show various body postures provided the other parts of the figure are moved relatively to this section. With the present arrangement I may, merely by movement of the actuating member 32, which is connected to the figure at but two points, make the necessary changes in the relative positions of the various portions of the figure to show accurately different body postures.

As is illustrated in Fig. 1, the various sections of the figure may carry appropriate representations of the skeleton and the internal organs of the human body, so that when the figure is placed in various postures, the effect of such postures on the organs of the body will be illustrated.

While I have shown and described a preferred embodiment of my invention, it will be understood that it is not to be limited to all of the details shown, but is capable of modification and variation within the spirit of the invention and within the scope of the appended claims.

What I claim is:

1. A device for posture study comprising a support, a two-dimensional jointed figure thereon having the profile contour of the human body, said figure including an abdominal-representing portion fixed to the support, a flat plane chest portion, and a flat plane pelvic portion, said last two named portions being pivoted to the first for relative movement with respect thereto, means for moving said pivoted portions comprising a pair of levers pivoted to the support and connected one to each of said portions to move the same, and means connecting together adjacent portions of said levers whereby one is actuated by the other, and the lever connected to the chest portion having a lost-motion connection with the corresponding portion of the figure whereby said portion is moved to a less extent than the adjacent part of said lever.

2. A device for posture study comprising a support, a two-dimensional jointed figure thereon having the profile contour of the human body, said figure including an abdominal portion fixed to the support, a flat plane chest portion, and a flat plane pelvic portion, each pivoted to the abdominal section and to said support and extending respectively above and below the same, a leg portion pivoted at its upper end to the abdominal portion, and means for moving said pivoted portions comprising a pair of levers pivoted at the rear of the support, one of said levers being connected to the chest section to move the same, and the other of said levers being connected to the pivot between the pelvic section and the leg section to move both thereof, and means connecting said levers whereby one is actuated by the other.

3. A device for posture study comprising a support, a two-dimensional jointed figure thereon having the profile contour of the human body, said figure including an abdominal portion fixed to the support, a flat plane chest portion, and a flat plane pelvic portion, each pivoted to the abdominal section and extending respectively above and below the same, a leg portion pivoted at its upper end to the abdominal portion, and means for moving said pivoted portions comprising a pair of levers pivoted at the rear of the support, one of said levers being connected to the chest section to move the same, and the other of said levers being connected to the pivot between the pelvic section and the leg section to move both thereof, and means connecting said levers whereby one is actuated by the other, one of said levers having a manually engageable actuating part extending beyond the support.

IRVING R. VERSOY.